United States Patent [19]
Krausz et al.

[11] 3,883,563
[45] May 13, 1975

[54] 4-(4'-CYCLOHEXYL-3'-CHLOROPHENYL)-γ-BUTYROLACTONE

[75] Inventors: Francois Krausz, Montpellier; Marcel Daniel Pierre Brunaud, St. Jean de Vedas, both of France

[73] Assignee: C M Industries, Paris, France

[22] Filed: July 19, 1974

[21] Appl. No.: 489,983

Related U.S. Application Data

[63] Continuation-in-part of Ser. No. 420,277, Dec. 29, 1973, which is a continuation of Ser. No. 35,919, May 8, 1970, abandoned.

[30] Foreign Application Priority Data
Aug. 6, 1973  France .............................. 73.28636

[52] U.S. Cl. .......... 260/343.6; 260/515 A; 424/279
[51] Int. Cl. .............................................. C07d 5/06
[58] Field of Search ................................. 260/343.6

[56] References Cited
UNITED STATES PATENTS
3,754,021  8/1973  Shen ............................. 260/515 A Primary Examiner—Lorraine A. Weinberger
Assistant Examiner—E. Jane Skelly
Attorney, Agent, or Firm—Stevens, Davis, Miller & Mosher

[57]  ABSTRACT

A pharmaceutically active lactone, particularly useful as an antiinflammatory agent, is provided, which has the formula

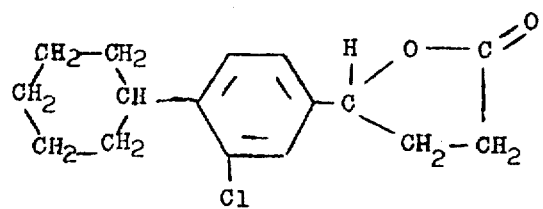

1 Claim, No Drawings

4-(4'-CYCLOHEXYL-3'CHLOROPHENYL)-γ-BUTYROLACTONE

CROSS REFERENCE TO RELATED APPLICATIONS

This application is a continuation-in-part of our copending application Ser. No. 420,277 filed Nov. 29, 1973 which in turn is a continuation of our now abandoned application serial No. 35,919 filed May 8, 1970.

BACKGROUND OF THE INVENTION

In recent years, various research efforts have been reported in the area of anti-inflammatory medicines including the area of halophenylalkylketones.

Representative of such efforts is the work of Glamkowski et al., U.S. Pat. No. 3,435,075, issued Mar. 25, 1969. An even more recent work is that of Shen et al, U.S. Pat. No. 3,754,021, issued Aug. 21, 1973, entitled "4-keto-4-(3'-chloro-4'-cyclohexyl)-phenylbutyric acid and related compounds". Although simple esters are contemplated, the title compound is a free acid.

We have now discovered that an excellent anti-inflammatory agent is produced through the provision of a novel lactone.

SUMMARY OF THE INVENTION

A method of treating a patient having an inflammatory condition is provided which comprises administering an anti-inflammatory-effective amount of a lactone of the formula

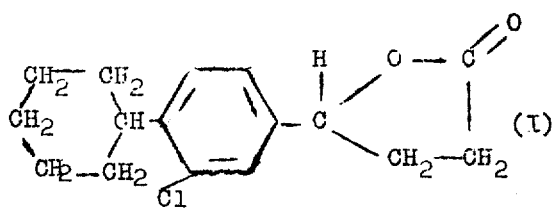

to said patient. The daily dosage of the lactone (I) is generally from about 20 mg to about 3g and preferably from about 800 mg to 1600 mg.

anti-inflammatory activity coupled with its relatively low toxicity.

The lactone (I) may be used in particular for both analgesic as well as the above antiinflammatory purposes in both human and veterinary medicine.

The invention comprises medicaments containing compounds defined above in particular in suitable forms for administration by oral, endorectal, parenteral or topic routes. These may be gelatine capsules or tablets containing 10 to 500 mg, preferably 200 to 400 mg of active principle per unit.

The daily dose is by the adult from 20 mg to 3 g of active ingredient, preferably from 800 to 1600 mg and more particularly 1200 mg.

The daily dose active ingredient by the infant may be preferably from 5 to 30 mg/kg of bodyweight.

An example of a formula for tablet is the following

| Lactone 1 (CM 31008) | 250 mg |
| Microcristalline cellulose | 100 mg |
| Rice starch | 20 mg |
| Magnesium stearate | 5 mg |
| Potassium polymethacrylate | 10 g |
| Talcum | 5 g |

The tablets may be prepared by the usual method of double compression or granulation, using an aqueous gum solution or a non-aqueous solvent such as ethyl alcohol. Examples of suitable excipients are: starch, talcum, gum arabic, magnesium stearate and carboxymethyl-cellulose.

The tablets may be rendered enteric by glutinisation or by coating them with a substance which is resistant to the action of gastric juice such as cellulose acetophthalate in order to prevent the action of gastric hydrochloric acid on the active principle or to prevent any gastric trouble.

The tablets may be sugar coated or not, opaque and, if desired, coloured.

The following examples serve to illustrate this invention, both with respect to the pharmaceutical safety and utility, as well as a synthesis for producing the novel lactone (I).

For convenience in understanding the invention, pharmacological data in the ensuring examples are tabulated below:

Table 1

| | Pharmaceutical results with lactone (I) | | | |
|---|---|---|---|---|
| | A | B | | C |
| | Granuloma | Oedema on paw | | Carrageenin abscess |
| | | 3 hours | 24 hours | |
| Example 6 (compound CM 31 008) | −22.3(22.5) | −31(50) | −58.9(50) | −48.5(50) |
| Example 7 (mixture 826 CB) | −12.7 (25) | −26.4(25) | −25.7(25) | −24 (50) |

The value between brackets indicates the daily administered dosis (mg/kg) during 5 days.

In accordance with further objects of the invention, there are provided the lactone (I) per se, as well as anti-inflammatory compositions containing the lactone (I).

DETAILED DESCRIPTION OF THE INVENTION

The lactone (I) has been found to possess excellent pharmaceutical activity, due to both its high degree of

EXAMPLE 1

DETERMINATION OF ACUTE TOXICITY

The acute toxicity of the lactone (I) was studied in mice after administration by both the intraperitoneal and oral routes.

The animals were divided at random into batches of 10 from a homogeneous population.

Toxicity by intraperitoneal route

The lactone (I) dissolved in a suitable solvent, is administered intraperitoneally in increasing doses, each dose being tried on a batch of 10 mice. The mortality of the mice is observed during 48 hours.

Toxicity by oral route

The lactone (I), in a suitable solvent, is administered orally by oesophageal tube. The mortality of the animals is observed during 72 hours.

The lethal dose 50 is calculated by Miller and Tainter's method of probits (Proceedings of the Society for Experimental Biology and Medicine, 1944, Vol. 57, page 261).

Compound (I) (CM 31008) has been found little toxic in mice. The L.D. 50 is approximately 1200 mg/kg via oral route and above 1000 mg/kg via intraperitoneal route.

EXAMPLE 2

ANALGESIC ACTION

The analgesic action was studied by the effect on visceral pain, using the test of Koster and Anderson (Federation Proceedings, 1959, Volume 18, page 412).

Peritoneal irritation is produced by the injection of dilute acetic acid into batches of 5 fasting mice chosen by drawing lots. The animal reacts to the pain by abdominal stretching movements with extension of the hind paws. The analgesic effect of the lactone (I), administered orally 30 minutes before the acetic acid, manifests itself by a reduction in the number of abdominal stretching movements counted during two periods of 5 minutes.

A range of doses is administered and the 50 percent effective dose is calculated by the method of probits (the 50 percent effective dose being dose which reduces by half the number of stretching movements relative to those of the control animals).

The 50 percent effective dose is 6,25 mg/kg.

EXAMPLE 3

ANTIINFLAMMATORY ACTION

The antiinflammatory power of the lactone (I) was studied by methods respectively numbered 1, 2a, 2b.

1. Effect on the proliferation of granulation tissue

Experimental granuloma in the normal rat treated orally (column A)

The cotton pellet test of Herschberger and Calhoun is used (Endocrinology 1957, volume 60, page 153) in the male rat having an average weight of 200 g.

Four cotton pellets are introduced subcutaneously into each animal (2 dorsally and 2 ventrally). The rats are then divided into batches of 10 by drawing lots. The treatment is started on the day of implantation and carried out orally. It is continued for 5 consecutive days. The rats are sacrificed on the day after the final treatment; the granulomata are removed, dried for 48 hours and then weighed.

The weights of the granulomata of the treated animals and those of the control animals are then compared by calculating Student's coefficient "t" (Statistical Tables for biological, agricultural and medical Research, Editor: S.R. Fisher, Oliver and Boyd, 1957). The results are expressed as a percentage of the variation in the weights of the granulomata of treated rats compared with those of the granulomata of control rats.

2. Effect on oedematous phenomena
   a. Oedema of the hind paw of the rat produced by carrageenin (Column B)

The technique of Winter and coworkers is used (Proceeding of the Society for Experimental Biology and Medicine, 1962, Volume 111, page 544), which consists in injecting 0.05 ml of a 1 percent suspension of carragenin into the plantar region of the right hind paw of the rat. The volume of the paw is measured with a plethysmograph.

The product is administered orally for 5 consecutive days, and oedema of the paw is produced on the fifth day, one hour after the last administration. The volume of the paw is measured before the injection of carrageenin, again three hours later, and finally 24 hours after the administration.

The difference in volume of the paw before and after the carrageenin is determined in the control batch and the treated batch. The percentage variation of the volume of the paws of the treated animals relative to that of the control animals is calculated. The percentage is negative if the volume is smaller and positive if it is larger.

b. Carrageenin abscess after 24 hours (Column C)

The local inflammatory oedema produced by subcutaneous injection of 0.5 ml of a 2 percent suspension of carrageenin is measured in the male rat. The abscess formed in this way contains a considerable amount of exudate at the end of 24 hours. It is sufficiently localised to be removed and immediately weighed.

The product is administered orally on two occasions: Immediately after the injection of carrageenin and 6 hours later. The batches of rats (male, 140±10 g) are sacrificed 24 hours after the injection and the abscesses are weighed.

The results are expressed as percentages of variation of the weights of the abscesses of the treated rats relative to the weights of the abscesses of a batch of control rats. The coefficient of Student is also calculated.

EXAMPLES: 4–7

SYNTHESIS OF THE LACTONE (I)

The synthesis of the lactone (I) may be conveniently carried out by using as the starting acid 4-(4'-cyclohexylphenyl)-4-ketobutyric acid (II). This starting acid (II) is treated with a chlorinating agent to introduce a 3'-chloro group, the resulting chlorimated intermediate (III), 4-(4'-cyclohexyl-3'-chlorophenyl)-4-ketobutyric acid, being converted to the lactone (I) through two steps:

First, the 4-keto function is reduced to hydroxy, the 4-hydroxy compound (IV) then being converted to the lactone (I) through the action of a dehydrating agent such as paratoluene sulfonic acid.

EXAMPLE 4

4-(3'-Chloro-4'-cyclohexylphenyl)-4-keto-butyric acid 177 g of anhydrous aluminium chloride are introduced into a three-necked 1-litre flask. A hot solution of 144 g of 4-(3'-Chloro-4'-cyclohexylphenyl)-4-ketobutyric acid in 330 ml of methylene chloride is added slowly from a dropping funnel. Slight reflux is observed during this addition. 33.2 ml of liquefied chlorine are then introduced slowly, drop by drop. This addition requires 5 hours. The solution is then poured on to 1 kg of ice containing 100 ml of concentrated hydrochloric acid. The aqueous phase is extracted twice, each time with 200 ml of methylene chloride, the organic phase is washed with water to pH 6.5 and dried and the organic solvent then evaporated. The acid is recrystallised from 500 ml of toluene. The yield is 64 percent. M.p.: 159°C.

EXAMPLE 5

4-(4'-cyclohexyl-3'-chlorophenyl)-4-hydroxy-butyric acid 600 g of 4-(4'-cyclohexyl-3'-chloro-phenyl)-4-ketobutyric acid, obtained according to the procedure of Example 4, 5 litres of tetrahydrofuran and 60 ml of a sodium hydroxide solution ($d$=1,38) are introduced in a 10 litres reactor with stirring in order to dissolve 150 g of sodium borohydride are added in small portions with cooling so that the temperature of the mixture does not rise above 70°. After this addition is completed, the reaction mixture is stirred for 15 hours. 5 litres of a 5 percent sodium hydroxide solution are added with stirring and then the mixture is extracted twice with 10 l of ether. The organic phase is washed twice with 20 l of water. The solvent is evaporated under vacuum. 480 g of orange-coloured oil are obtained.

EXAMPLE 6

4-(4'-cyclohexyl-3'-chlorophenyl-γ-butyrolactone

The oil obtained above in example 5 (480 g), 4.8 l of toluene and 4.8 g of para-toluene-sulfonic acid are poured in a reactor equipped with a water-separator. The mixture is heated at reflux temperature for 2 hours; the water separates as it is formed (about 30 ml). The solvent is evaporated under vacuum and the residue is added to 2 l of water and extracted twice with 2 l of ether. The ethereal extracts are washed twice with 1 l of a saturated sodium bicarbonate solution then twice with 2 l of water, and dried with sodium sulfate. The solvent is evaporated. 470 g of orange-coloured oil are obtained which are dissolved in 470 ml of cyclohexane. 1.5 l of hexane is added and allowed to crystallise in a refrigerator. 470 g of crystals are filtered and recrystallised as follows: the solid is dissolved in 940 ml of boiling cyclohexane, 10 g of bleaching carbon are added and the solution is filtered hot. The clear solution obtained is allowed to cool to 20° and 2 l of hexane are added. A colourless solid precipitates which is filtered and dried under vacuum. 352 g (yield 65 percent for the two steps) M.P. (Kofler block)=64°.

EXAMPLE 7

The lactone (I) may also be obtained in admixture of the hydroxy compound produced in example 5 directly from the 4-keto compound in accordance with the following synthesis:

15 g (0.05 mol) of 4-(3'-chloro-4'-cyclohexylphenyl)-4-ketobutyric acid are introduced into 100 ml of anhydrous ethanol. 0.1 mol (5g) of sodium hydride is added in small portions in the course of 0.5 hour. After this addition is completed, the temperature is allowed to rise to 20°C and the reaction mixture is stirred for 2 hours. The reaction mixture is then poured into 200 ml of water, acidified to pH 2 with concentrated hydrochloric acid, and extracted with diethyl ether. The ethereal extracts are combined, dried and the ether is evaporated. 13 g of a mixture of the lactone (I) and a predominant portion of 4-(3'-chloro-4'-cyclohexylphenyl)-4-hydroxybutyric acid is obtained, for an overall yield of the acid of 86 percent. The lactone (I) may be separated from the acid component by known conventional separatory techniques, or the mixture, "826 CB", may be used as an anti-inflammatory agent in accordance with the disclosure of our copending application Ser. No. 420,277 filed Nov. 29, 1973.

What is claimed is:

1. A compound of the formula

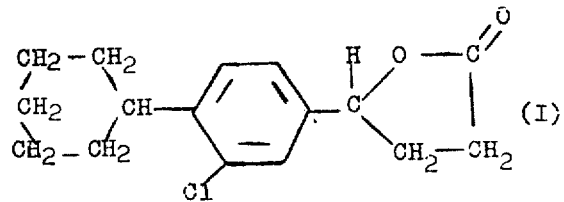

* * * * *